Sept. 22, 1959     A. BASHOVER     2,904,928
DOLL EYE ASSEMBLY
Filed Feb. 8, 1957     2 Sheets-Sheet 2
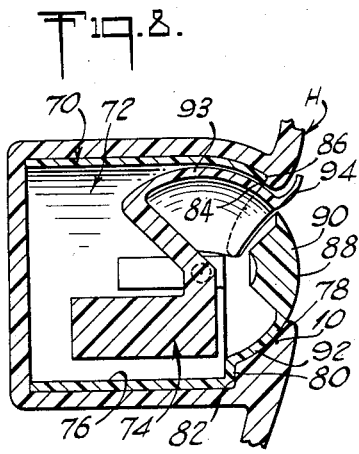
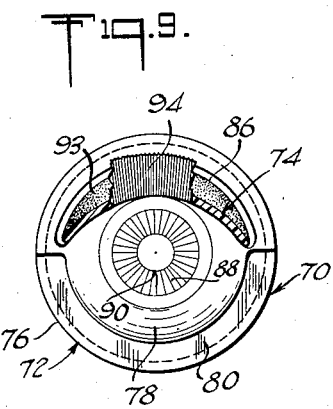
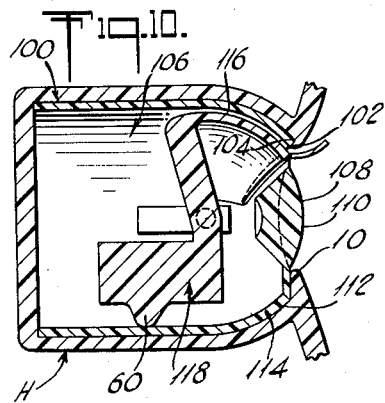
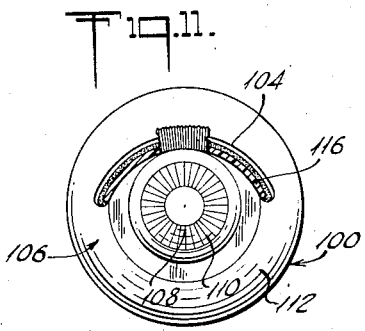
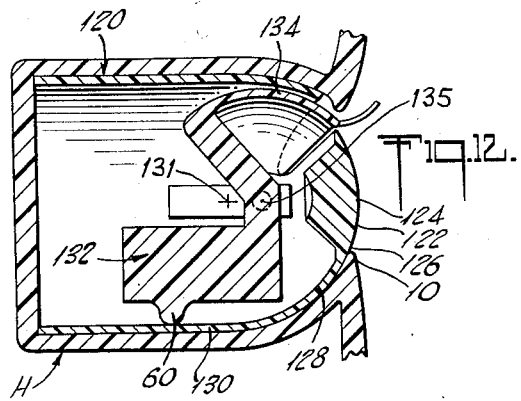
INVENTOR
ALBERT BASHOVER United States Patent Office 2,904,928
Patented Sept. 22, 1959

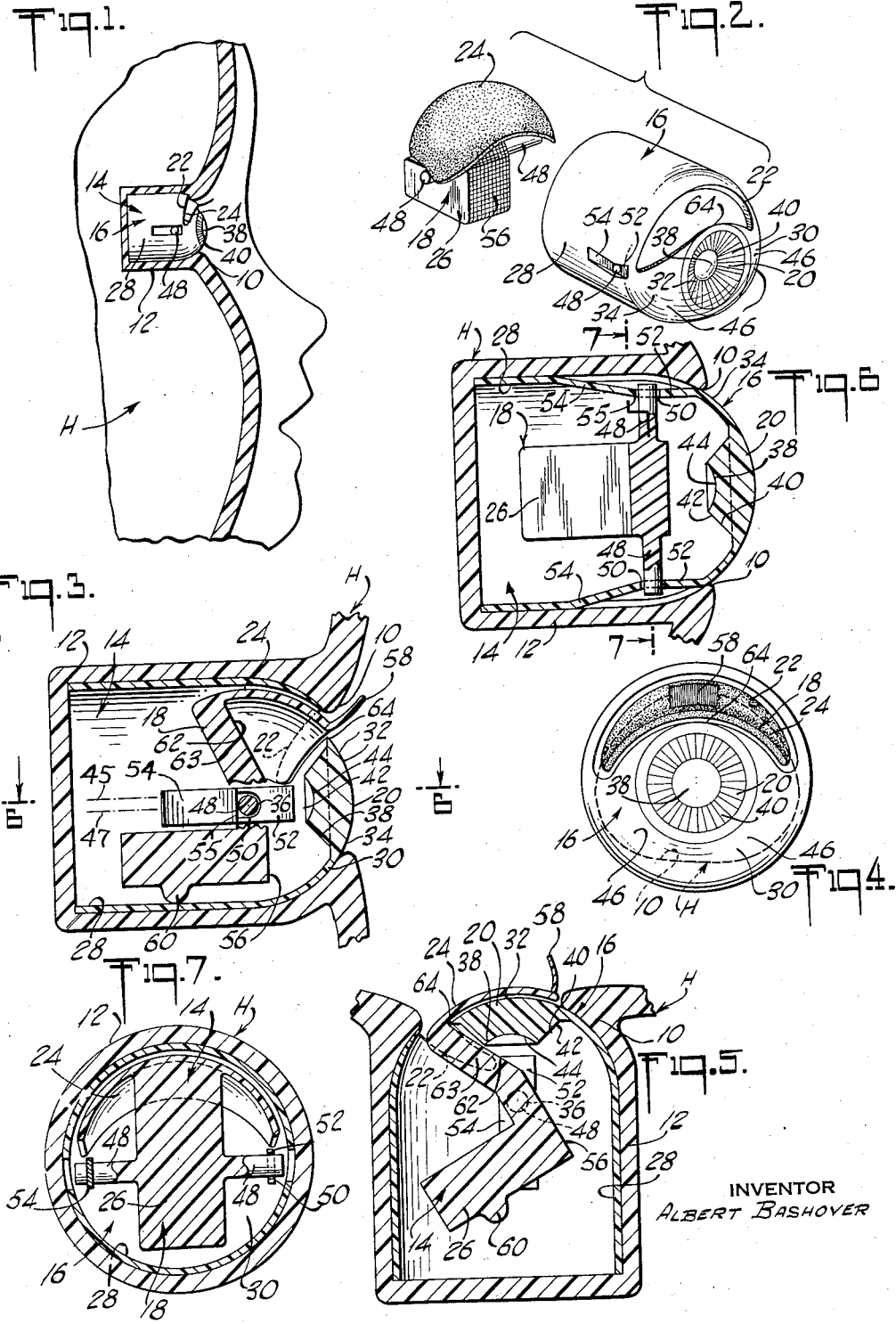

2,904,928
DOLL EYE ASSEMBLY

Albert Bashover, Livingston, N.J., assignor to Margon Corporation, Newark, N.J., a corporation of New Jersey Application February 8, 1957, Serial No. 638,939

13 Claims. (Cl. 46—166)

This invention relates generally to a doll eye assembly and, more particularly, to an individual doll eye assembly adapted for insertion in an individual eye socket of a flexible doll head.

Currently the vogue is the use of flexible doll heads, particularly heads made by slush molding of vinyl compound slurries, because this process is inherently inexpensive, uses inexpensive molds, and produces one-piece heads of excellent detail with a soft-skin-like texture. Such heads have led to the use of substantially enclosed eye sockets molded integrally with the head, each socket receiving an individual eye assembly such as those shown in assignee's prior Patents Numbered 2,696,064, 2,700,248 and 2,748,531. In said patented eye assemblies, the eye is movable in response to a change in position of the doll head, and a part of the eye itself is colored to simulate an eyelid.

In contrast to such known constructions, the primary object of the present invention is the provision of an individual eye assembly having a movable eyelid separate from a stationary eye, and in which the eyelid alone is weight actuated, said assembly being adapted for insertion in an individual eye socket of a flexible doll head.

A further object of the invention is the provision of a doll eye assembly of the specified character in which the components may be economically mass-produced and assembled, and in which the assembly may be readily inserted in the eye sockets of the head.

Still another object of the present invention is the provision of a doll eye assembly of generally improved construction and appearance, and which is adapated to impart a new dimension of fascination to a doll provided with such eye assemblies.

Other objects, features and advantages of the present invention will become apparent as the description thereof proceeds, when considered in connection with the accompanying illustrative drawings.

In the drawings, which illustrate the best modes now contemplated by me for carrying out my invention:

Fig. 1 is a vertical sectional view of a doll head showing an eye assembly of the present invention positioned in an eye socket;

Fig. 2 is a perspective view showing the components of the eye assembly in disassembled relation;

Fig. 3 is a vertical sectional view of the eye socket and eye assembly with parts of the eye assembly broken away to reveal structural details;

Fig. 4 is a front view of the assembly;

Fig. 5 is a vertical sectional view of the eye socket and eye assembly with the latter shown in the sleeping or closed eye position corresponding to the supine position of the head;

Fig. 6 is a sectional view taken approximately on the line 6—6 of Fig. 3;

Fig. 7 is a sectional view taken approximately on the line 7—7 of Fig. 6;

Fig. 8 is a view similar to Fig. 3 but showing another embodiment of the present invention;

Fig. 9 is a front view thereof;

Figs. 10 and 11 are views similar to Figs. 8 and 9, respectively, showing another embodiment of the present invention; and Fig. 12 is a view similar to Fig. 3, showing still another embodiment of the present invention.

Referring to the drawings, and more particularly to Figs. 1 through 7 thereof, there is shown a doll head H having an eye opening at 10 with a substantially enclosed eye socket 12 within the head behind said eye opening. The eye socket 12 receives the eye assembly 14, which is an independent assembly and unconnected with another similar eye assembly received in a similar eye socket of the head. The head is soft and flexible, and is preferably made by the slush molding of vinyl compound slurries. The eye sockets 12 are provided during the molding operation, and for this purpose the mold is provided with cores or so-called "plugs," which form eye openings 10 and the sockets 12. Thus the flexible head H, having eye openings and individual eye sockets within the head, is molded in a generally similar manner as the heads shown in assignee's patents referred to above.

Pursuant to the present invention, the doll's eye assembly 14 preferably comprises only two parts, a rigid housing 16 (Fig. 2) and an eyelid member 18 which is pivotally mounted in the housing. The housing 16 has an eye 20 in fixed relation therewith at the front of the housing, and a crescent-shaped slot 22 disposed above the eye for the extension therethrough of the eyelid 24 of the eyelid member 18. The eyelid member has a weight 26 disposed within the housing for moving the eyelid 24 to the eye closed position shown in Fig. 5 when the head is in a supine position, and to an eye open position, shown in Fig. 3, when the head is in an upright position.

The housing 16 has a cylindrical part 28, with an open back, and a generally hemispherical forward part 30, the latter part having the eye 20 and the eyelid slot 22. The radius of the hemispherical part is somewhat less than that of the cylinder. The housing and eye are preferably molded out of a single integral body of transparent plastic tinted for iris color, and the eye has a front spherical surface 32 which conforms to the spherical surface 34 of the forward part of the housing. In the embodiment of Figs. 1 through 7, the eye has a front spherical surface of common radius and center with the spherical surface of the forward part of the housing, and the pivotal axis 36 of the eyelid member 18 is disposed at the common center of the spherical surfaces of the eye 20 and housing part 30.

The eye 20 has pupil and iris portions 38 and 40 (Fig. 6), respectively, the iris portion being frusto-conical in shape and having a serrated back surface 42 which reflects light of a color similar to the color of the transparent plastic material of the housing. The pupil portion has a smooth and slightly concave, relatively non-reflective back surface 44, so that the pupil portion appears black when coupled with the relatively lightproof background provided by the housing and socket. A more detailed description of the construction of these parts of the eye may be found in assignee's Patent No. 2,657,500, issued on November 3, 1953, in the name of Hans W. Samolowitz, and entitled "Transparent Doll Eye." If desired the eye 20 may be of any suitable construction other than the construction specifically shown and described here, and such eye may be formed as a separate part and suitably integrated with the housing.

The substantially hemispherical forward part 30 of the housing is printed or coated with white, as indicated at 46 (Fig. 2), to simulate the eyeball portion of the eye. It will be noted that the common center of the spherical surfaces of the eye and housing, which is coincident with the pivotal axis 36 of the eyelid member, is disposed slightly below the longitudinal axis 45 (Fig. 3) of the housing, as is shown by the line 47, this arrangement providing the requisite clearance for the pivotal movement of the eyelid 24 with respect to the wall of the housing.

The eyelid member 18 has a pair of aligned trunnions 48 (Fig. 7) which are received in companion bearings 50 provided in the flattened wall portions 52 (Fig. 6) of the housing. The resilient longitudinal retaining fingers 54 are integrally formed with the housing and cooperate with the trunnions 48 to retain the latter in position in the bearings 50. In practice, the trunnions spring or flex the fingers 54 outwardly as the eyelid member is pushed inwardly through the open rear end of the housing, until the trunnions pass the free ends 55 of the fingers, whereupon they spring back in. This provides for the facile assembly of the eyelid member with the housing. It will be apparent that any suitable arrangement, other than the specific arrangement herein illustrated and described, may be utilized to pivotally mount the eyelid member in the housing. The housing is open at the back, and is of such dimension as to receive the eyelid member through the open back.

In the preferred embodiment, the eyelid member 18, including its weight and trunnions, is molded out of a single integral body of a plastics material. The plastics material may be flesh colored to provide a flesh colored eyelid 24, in which case the forward wall of the weight 26 is blackened, as indicated at 56 (Fig. 3), so as to provide a black background for the pupil 38 of the eye. However, if desired, the eyelid member may be molded of a black plastics material, in which case the eyelid 24 is coated with a flesh color in any desired manner, to simulate a human eyelid.

The eyelid 24 is of arcuate or spherical configuration having a center of radius coincident with the pivotal axis 36 of the eyelid member, it being understood that sufficient clearance is provided at the upper wall of the housing and eye to provide for the free pivotal movement of the eyelid. Differently expressed, the eyelid is concavo-convex, and conforms generally to the surface of a sphere. The eyelid may be lash-free, or may be provided with any suitable lash, for example, a soft or flexible lash 58 which is integrally molded with a soft eyelid member. If desired, the eyelash may be a filamentary soft lash, or may be a hard, relatively rigid lash which is integrally molded with a rigid eyelid member.

The weight 26 at the bottom thereof is provided with a suitable stop 60 (Figs. 3 and 5), which coacts with the bottom wall of the housing to limit the eye opening movement of the eyelid member. The wall 62 of the web part 63 of the eyelid member coacts with the peripheral edge 64 of the eye, as shown in Fig. 5, to limit the closing movement of the eyelid member. If desired, any suitable motion-limiting arrangement may be utilized other than the specific arrangement herein illustrated and described. The weight 26 actuates the eyelid 24 to cover and uncover the eye, the movement of the weight being responsive to the change of position of the head in the usual well-known manner.

Referring now to Figs. 8 and 9, there is shown an eye assembly 70 which is generally similar to the eye assembly 14, differing therefrom in the respects to be noted hereinafter. The eye assembly 70 is of two-piece construction, as before, comprising a housing 72 which pivotally mounts an eyelid member 74, the cylindrical part 76 of the housing being stepped radially inward at the forward hemispherical part 78, in order to define a peripheral shoulder 80 at the junction of said cylindrical and forward parts. The head H in back of the eye opening is stepped outwardly to form a shoulder 82, and the peripheral shoulder 80 of the housing abuts the shoulder 82 of the head. The head may be stepped at 84 also, and the peripheral edge 86 of the top wall of the housing abuts the peripheral shoulder 84. This arrangement more dependably and accurately results in proper spacing of the eye in the eye opening of the head. The front spherical surface 88 of the eye 90 is concentric and of common radius with the spherical surface 92 of the hemispherical forward part of the housing, and this center is disposed at the center of radius of the eyelid 93 which is coincident with the pivotal axis of the eyelid member 74. The common center is disposed along the longitudinal axis of the housing, as distinguished from Figs. 1 through 7 in which the corresponding center is disposed below the longitudinal axis of the housing. The radius of curvature of the eye is less than that of the lid, which in turn is less than that of the cylinder of the housing. The eyelid 93 is shown with a hard lash 94 which is integrally molded with the eyelid member, said lash being black and serving as a stop to limit the motion of the eyelid member in the eye opening direction. In the eye closing direction, the lid fully covers the eye.

Referring next to Figs. 10 and 11, there is shown another form of eye assembly 100 which differs from the eye assemblies previously described in the manner to be noted hereinafter. The head is provided with a shoulder 102, which cooperates with the peripheral front edge 104 of the housing 106 to properly position the eye 108 with respect to the eye opening of the head. The eye 108 has a front spherical surface 110, which is concentric with the spherical surface 112 of the substantially hemispherical forward part 114 of the housing. The radius of the eye spherical surface 110, however, is less than the radius of the spherical surface 112 of the housing, in order to recess the eye with respect to the housing and eye opening, so as to closely simulate the appearance of the human eye. Moreover, the lid, when closed, fully covers the eye. The common center of the spherical surfaces 110 and 112 is coincident with the center of radius of the eyelid 116 and the pivotal axis of the eyelid member 118, the coincident common centers and eyelid pivotal axis being disposed along the longitudinal axis of the housing. The radius of curvature of the eye is less than that of the lid, which is less than that of the forward portion of the housing. The latter usually is the same as the radius of the cylinder itself.

The eye assembly 120 shown in Fig. 12 is characterized by an arrangement in which the front spherical surface 122 of the eye 124 is of common radius and center with the spherical surface 126 of the substantially hemispherical forward part of the housing 130, the said center being located at 131. The pivotal axis of the eyelid member 132 and the center of radius of the eyelid 134 are also coincident, but located at 135, forwardly of the common center 131 of the spherical surfaces 122 and 126. The pivotal axis of the eyelid member, the coincident center 135 of the eyelid 134, and the common center 131 for the spherical surfaces 122 and 126 both are disposed along the longitudinal axis of the cylindrical housing. The forward displacement of center 135 affords clearance between the lid and the eye, without necessitating an increase in radius of the lid.

While the herein illustrated and described eye assemblies are directed to a simulated human eye construction, it will be understood that, if desired, such eye assemblies may simulate an animal eye.

It is believed that the construction of the described eye assemblies, and the components thereof, related one to another in the manner particularly described, as well as the advantages of the described assemblies, will be apparent from the foregoing detailed description. It also will be apparent that while preferred forms of the invention have been shown and described, changes may be made in the structures disclosed, without departing from the spirit of the invention, as sought to be defined in the following claims.

I claim:

1. A doll's eye assembly for use in a flexible head having eye openings and individual eye sockets within the head to receive independent unconnected eye assemblies, said eye assembly comprising a housing having an eyelid member pivotally mounted therein, said housing comprising a cylindrical part and a generally hemispherical forward part slotted for the extension therethrough of an eyelid, said forward part being peripherally continuous with said cylindrical part and having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head.

2. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head.

3. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head, said housing and eye being molded out of a single integral body of transparent plastic tinted for iris color.

4. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head, said housing and eye being molded out of a single integral body of transparent plastic tinted for iris color, and said eyelid member including its weight and trunnions being molded out of a single integral body of plastics material.

5. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head, said eye being integrally formed with said housing and having a front spherical surface which conforms to the spherical surface of said forward part of the housing.

6. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head, said eye having a front spherical surface of common radius and center with the spherical surface of said forward part of the housing, the pivotal axis of said eyelid member being disposed at the common center of said spherical surfaces, but said eyelid member being of larger radius.

7. A doll's eye assembly for use in a flexible head having eye openings and individual eye sockets within the head to receive independent unconnected eye assemblies, said eye assembly comprising a housing having an eyelid member pivotally mounted therein, said housing comprising a cylindrical part and a generally hemispherical forward part slotted for the extension therethrough of an eyelid, said forward part being peripherally continuous with said cylindrical part, said cylindrical part having a bottom portion stepped radially inward at said forward part to define a peripheral shoulder at the junction of said cylindrical and forward parts, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head.

8. In combination, a doll head and an eye assembly therefor, said doll head being made of a flexible material and having an eye opening and a substantially enclosed eye socket within the head behind said eye opening for the reception of said assembly, said eye assembly comprising a housing having an eyelid member pivotally mounted therein, said housing comprising a cylindrical part and a generally hemispherical forward part slotted for the extension therethrough of an eyelid, said forward part being peripherally continuous with said cylindrical part, said cylindrical part having a bottom portion stepped radially inward at said forward part to define a peripheral shoulder at the junction of said cylindrical and forward parts, said forward part having a fixed eye disposed below said slot, said eyelid member having an eyelid disposed to an extend through said slot for movement relative to said eye for covering and uncovering the latter, and a weight connected to said eyelid member and disposed within said housing for actuating said eyelid relative to said eye in response to a change of position of the head, the head in back of said eye opening being stepped outward to form a shoulder against which said peripheral shoulder abuts, so as to properly space said eye in the eye opening.

9. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head, said eye having a front spherical surface concentric with the spherical surface of said forward part of the housing with the radius of said eye spherical surface being less than the radius of said housing spherical surface to recess said eye with respect to said housing.

10. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed within said housing for actuating said eyelid relative to said eye in response to a change of position of the head, said eye having a front spherical surface of common radius and center with the spherical surface of said forward part of the housing, the pivotal axis of said eyelid member and the center of radius of said eyelid being coincident at a point located forwardly of the common center of said spherical surfaces.

11. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid extending through said slot for movement relative to said eye for covering and uncovering the latter, and a weight connected to said eyelid member and disposed within said housing for actuating said eyelid relative to said eye in response to a change of position of the head, said eye having a front spherical surface of common radius and center with the spherical surface of said forward part of the housing, said eyelid being of spherical configuration having a center of radius coincident with the pivotal axis of said eyelid member and disposed at the common center of said spherical surfaces.

12. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid extending through said slot for movement relative to said eye for covering and uncovering the latter, and a weight connected to said eyelid member and disposed within said housing for actuating said eyelid relative to said eye in response to a change of position of the head, said eye having a front spherical surface of common radius and center with the spherical surface of said forward part of the housing, said eyelid of spherical configuration having a center of radius coincident with the pivotal axis of said eyelid member and disposed at the common center of said spherical surfaces, said common center being disposed below the longitudinal axis of said housing.

13. A doll's eye assembly for use in a flexible head having eye openings and individual eye sockets within the head to receive independent unconnected eye assemblies, said eye assembly comprising a housing having an eyelid member pivotally mounted therein, said housing having a peripherally continuous generally hemispherical forward part slotted for the extension therethrough of an eyelid, said forward part having a fixed eye disposed below said slot, said eyelid member having an eyelid disposed to extend through said slot for movement relative to said eye for covering and uncovering the latter, and a weight connected to said eyelid member and disposed in said housing for actuating said eyelid relative to said eye in response to a change of position of the head, said eye having a front spherical surface concentric with the spherical surface of said forward part of the housing with the radius of said eye spherical surface being less than the radius of said housing spherical surface in order to recess said eye with respect to said housing, said eyelid being of spherical configuration having a center of radius coincident with the pivotal axis of said eyelid member and disposed at the common center of said spherical surfaces, said common center being disposed along the longitudinal axis of said housing.

References Cited in the file of this patent

UNITED STATES PATENTS

| 1,997,123 | Salemme | Apr. 9, 1935 |
| 2,051,865 | Konoff et al. | Aug. 25, 1936 |
| 2,143,029 | Popovich | Jan. 10, 1939 |
| 2,663,972 | Lee | Dec. 29, 1953 |
| 2,753,660 | Brudney | July 10, 1956 |